United States Patent
Alland

(10) Patent No.: US 9,568,600 B2
(45) Date of Patent: Feb. 14, 2017

(54) MIMO ANTENNA WITH ELEVATION DETECTION

(71) Applicant: DELPHI TECHNOLOGIES, INC., Troy, MI (US)

(72) Inventor: Stephen W. Alland, Newbury Park, CA (US)

(73) Assignee: Delphi Technologies, Inc., Troy, MI (US)

(*) Notice: Subject to any disclaimer, the term of this patent is extended or adjusted under 35 U.S.C. 154(b) by 314 days.

(21) Appl. No.: 14/197,404

(22) Filed: Mar. 5, 2014

(65) Prior Publication Data

US 2015/0253420 A1    Sep. 10, 2015

(51) Int. Cl.

| G01S 13/44 | (2006.01) |
|---|---|
| H01Q 21/08 | (2006.01) |
| G01S 13/93 | (2006.01) |
| G01S 7/03 | (2006.01) |
| G01S 7/28 | (2006.01) |
| G01S 7/292 | (2006.01) |
| G01S 7/35 | (2006.01) |
| G01S 13/00 | (2006.01) |
| G01S 13/42 | (2006.01) |
| H01Q 21/06 | (2006.01) |

(52) U.S. Cl.
CPC .............. *G01S 13/4454* (2013.01); *G01S 7/03* (2013.01); *G01S 7/2813* (2013.01); *G01S 7/2925* (2013.01); *G01S 7/354* (2013.01); *G01S 13/003* (2013.01); *G01S 13/424* (2013.01); *G01S 13/931* (2013.01); *H01Q 21/065* (2013.01); *H01Q 21/08* (2013.01)

(58) Field of Classification Search
CPC ................ H01Q 21/06–21/18; G01S 13/4454; G01S 13/003; G01S 7/2813; G01S 7/2925; G01S 7/354; G01S 13/424; G01S 7/03; G01S 13/931
See application file for complete search history.

(56) References Cited

U.S. PATENT DOCUMENTS

| 7,986,260 B2 * | 7/2011 | McMakin | ............... G01S 7/026 342/175 |
|---|---|---|---|
| 8,289,203 B2 * | 10/2012 | Culkin | ................ H01Q 21/061 342/117 |

(Continued)

FOREIGN PATENT DOCUMENTS

| EP | 0 947 852 A1 | 10/1999 |
|---|---|---|
| KR | 2013 0115510 A | 10/2013 |
| WO | 2010/095946 A1 | 8/2010 |

OTHER PUBLICATIONS

European Search Report dated Jul. 23, 2015.

*Primary Examiner* — Matthew M Barker
(74) *Attorney, Agent, or Firm* — Lawrence D. Layton

(57) ABSTRACT

A multiple input multiple output (MIMO) antenna for a radar system that includes a receive antenna, a first transmit antenna, and a second transmit antenna. The receive antenna is configured to detect radar signals reflected by a target toward the receive antenna. The first transmit antenna is formed of a first vertical array of radiator elements. The second transmit antenna is formed of a second vertical array of radiator elements distinct from the first vertical array. The second transmit antenna is vertically offset from the first transmit antenna by a vertical offset distance selected so an elevation angle to the target can be determined.

2 Claims, 7 Drawing Sheets

(56) References Cited

U.S. PATENT DOCUMENTS

| | | | | |
|---|---|---|---|---|
| 8,432,307 B2* | 4/2013 | Cornic | ............... | G01S 13/424 |
| | | | | 342/118 |
| 8,466,829 B1* | 6/2013 | Volman | ............... | G01S 3/48 |
| | | | | 342/133 |
| 8,717,224 B2* | 5/2014 | Jeong | ............... | G01S 13/4463 |
| | | | | 342/70 |
| 8,797,208 B2* | 8/2014 | Stirling-Gallacher | .. | G01S 13/34 |
| | | | | 342/179 |
| 9,041,587 B2* | 5/2015 | Longstaff | ............... | G01S 13/882 |
| | | | | 342/179 |
| 9,121,943 B2* | 9/2015 | Stirling-Gallacher | .. | G01S 13/89 |
| 9,203,160 B2* | 12/2015 | Blech | ............... | H01Q 21/08 |
| 2011/0074620 A1* | 3/2011 | Wintermantel | ......... | G01S 7/032 |
| | | | | 342/70 |
| 2011/0140952 A1 | 6/2011 | Kemkemian et al. | | |
| 2014/0104097 A1* | 4/2014 | Binzer | ............... | G01S 13/931 |
| | | | | 342/74 |

* cited by examiner

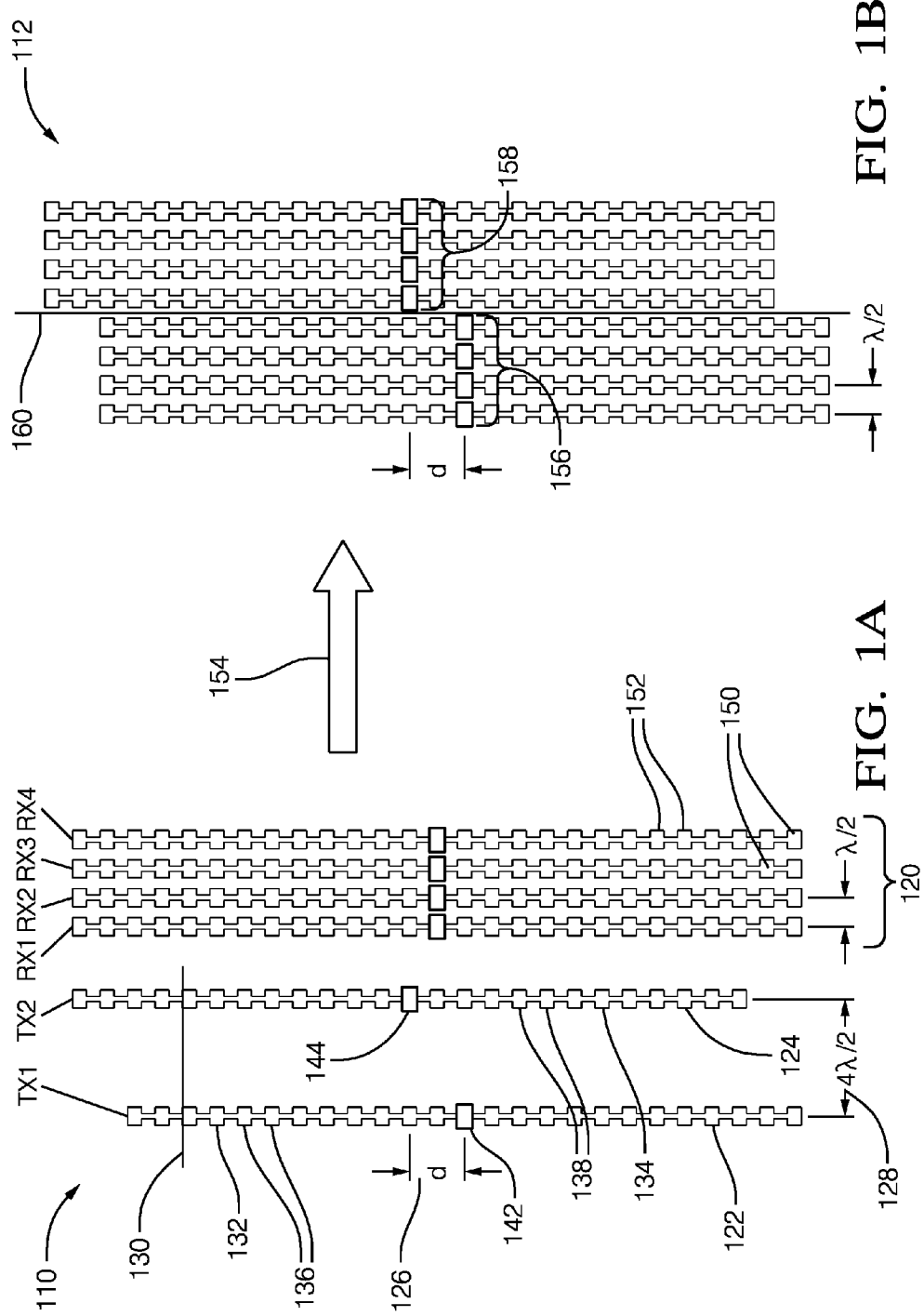

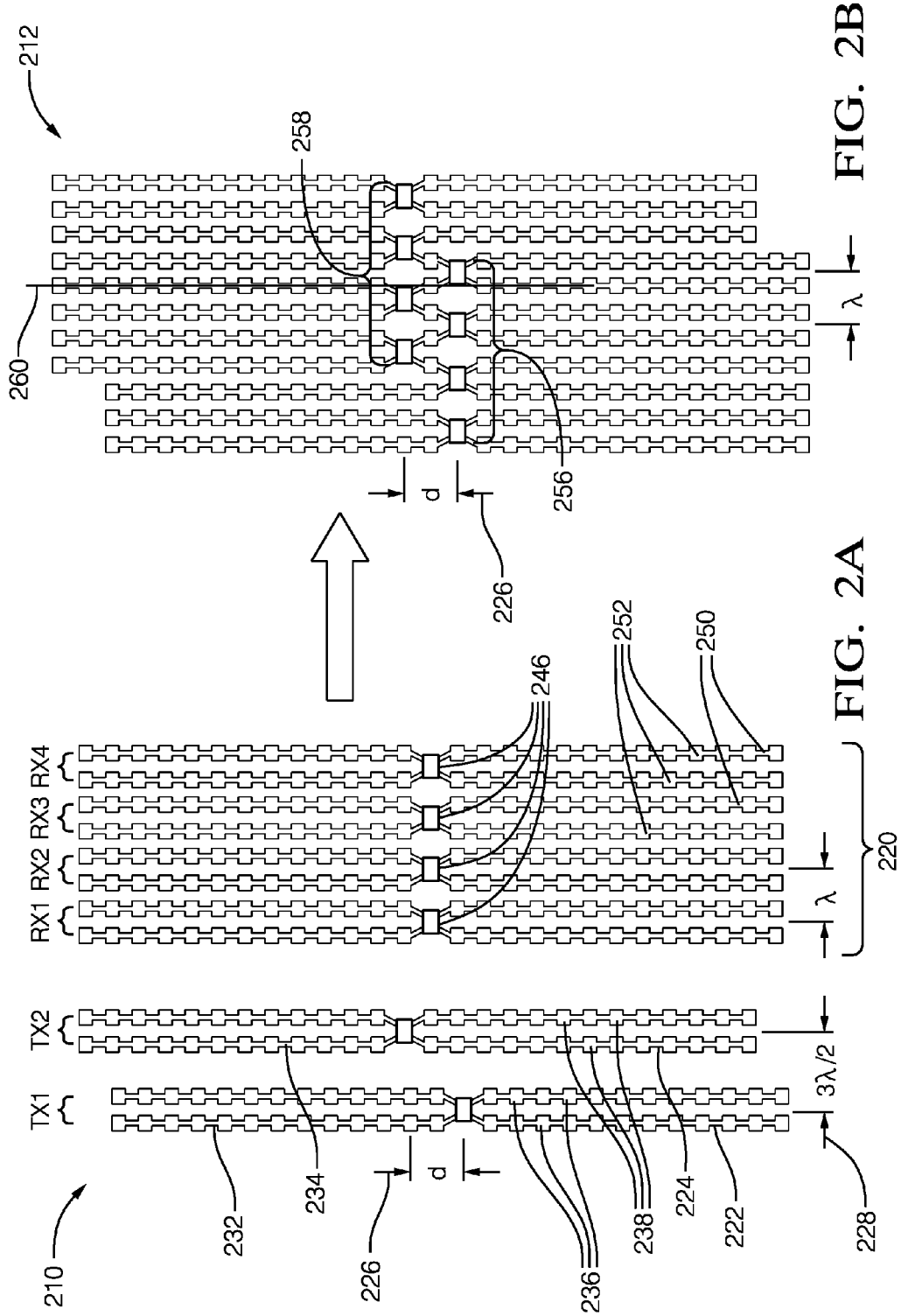

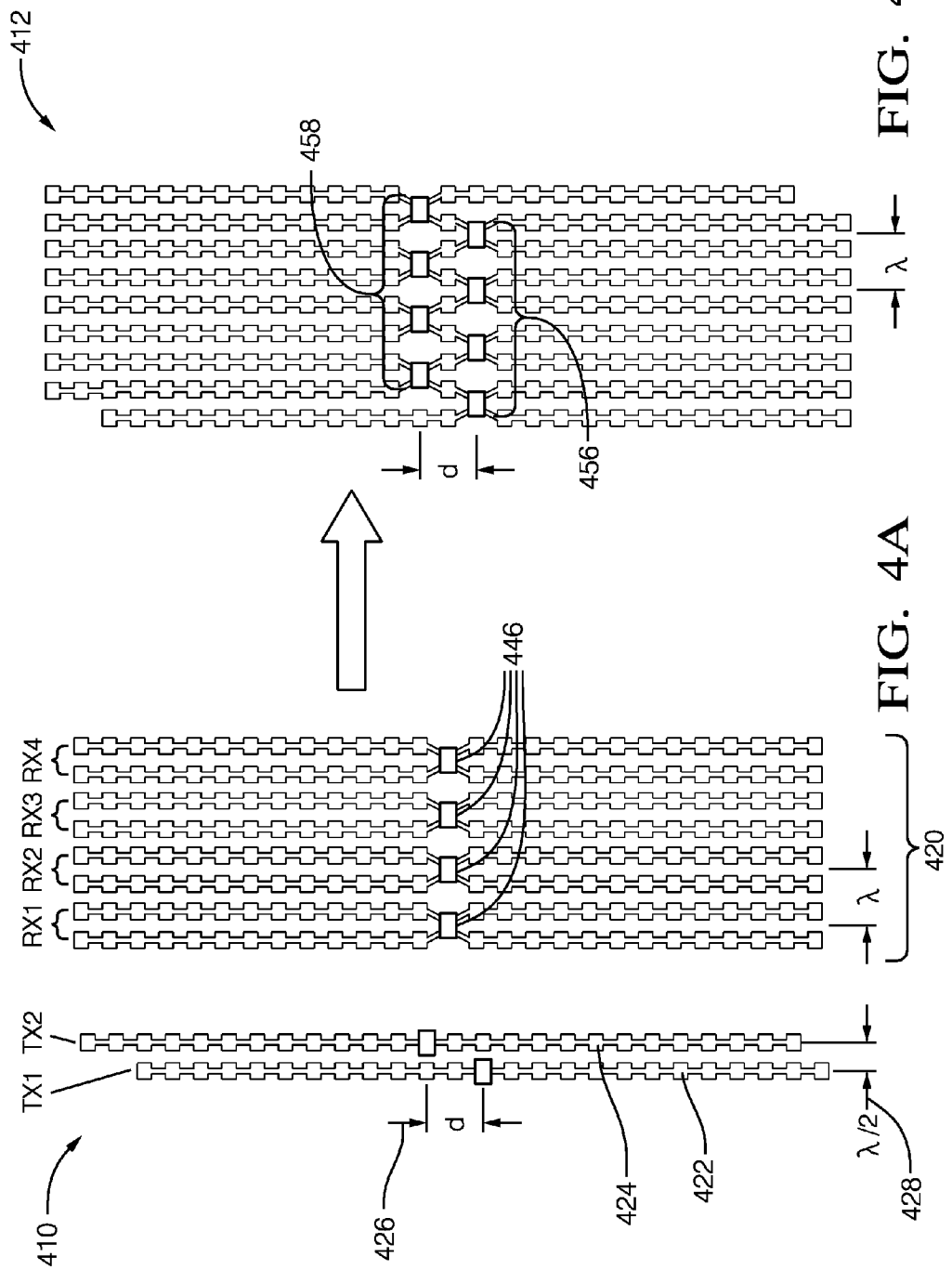

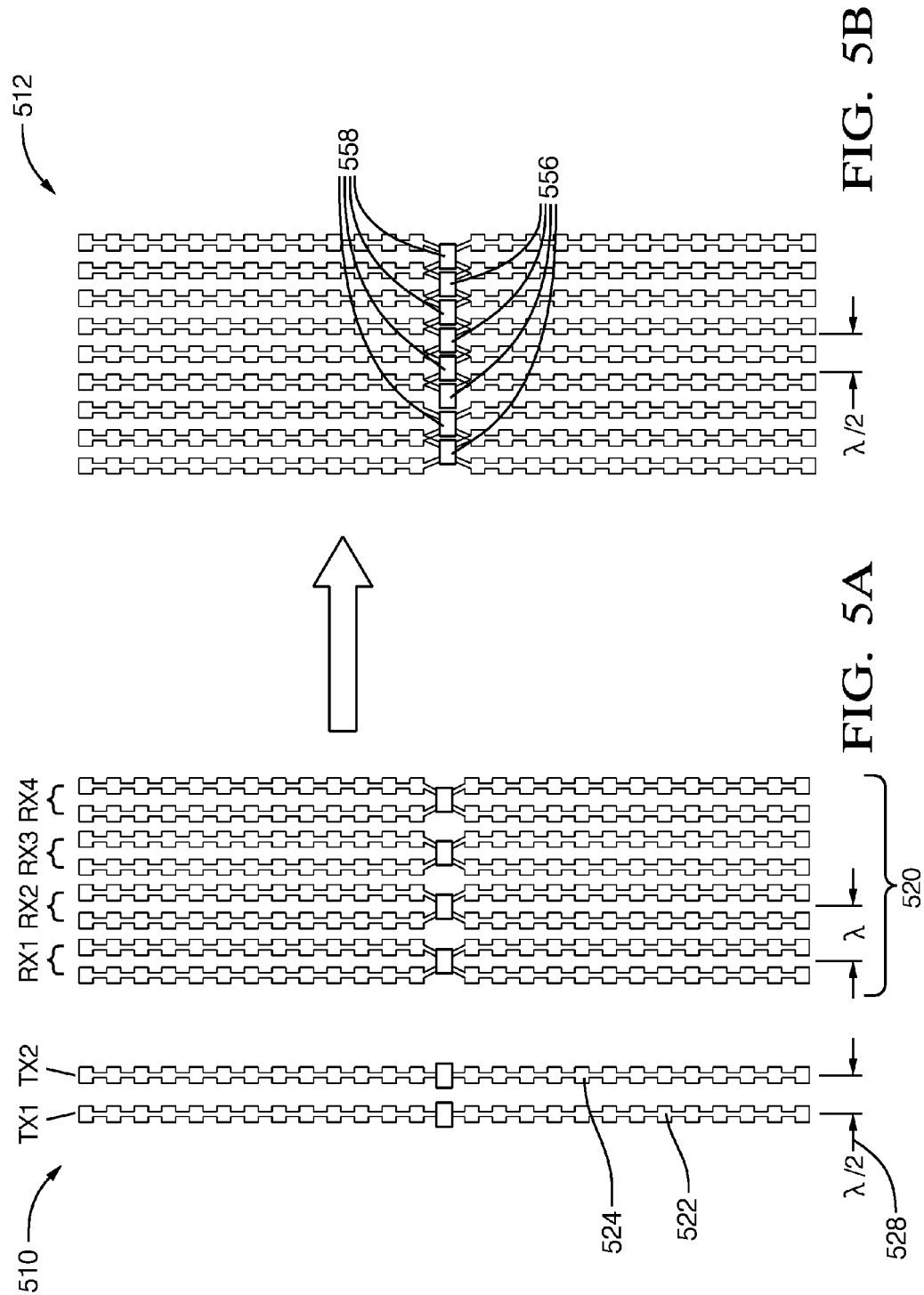

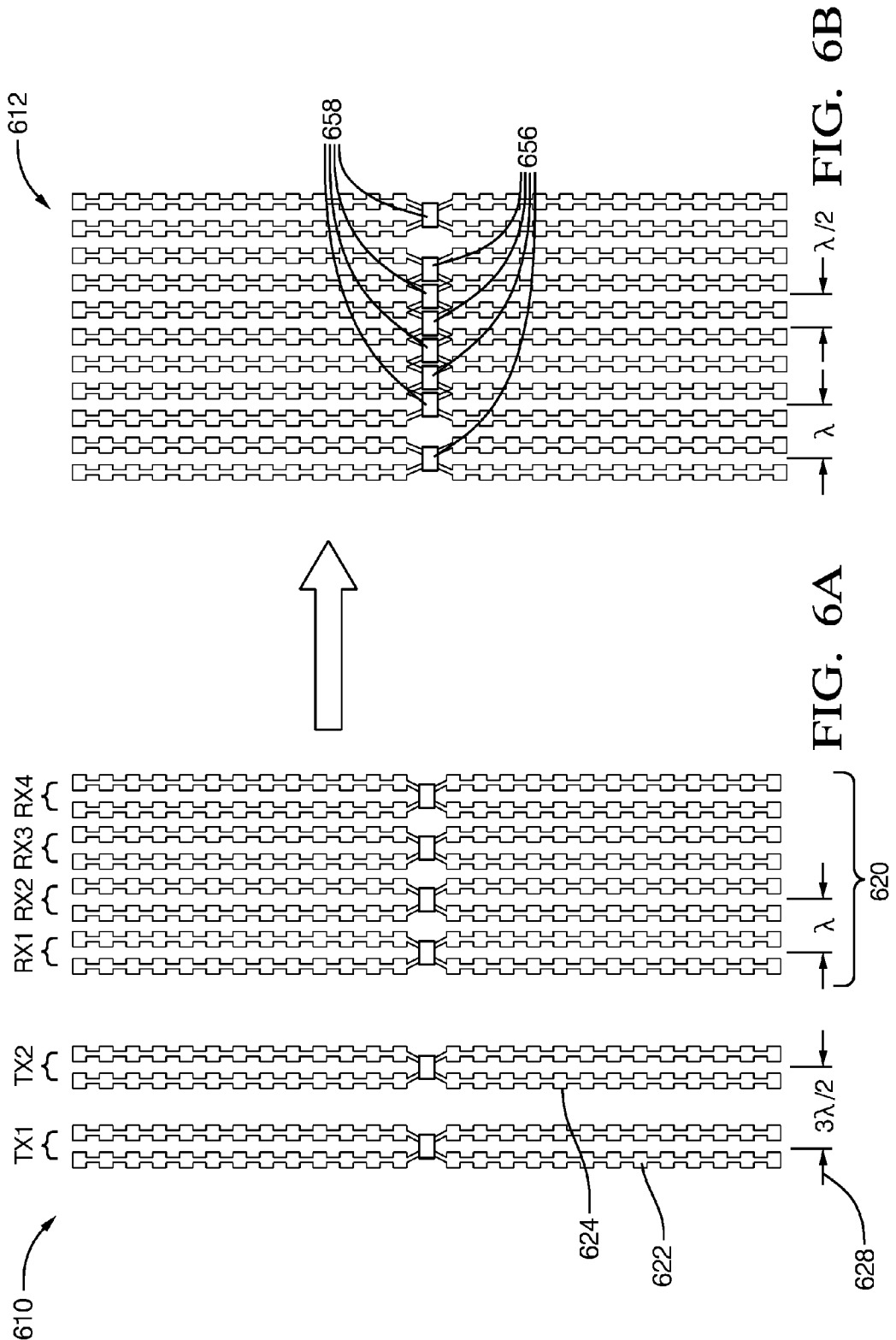

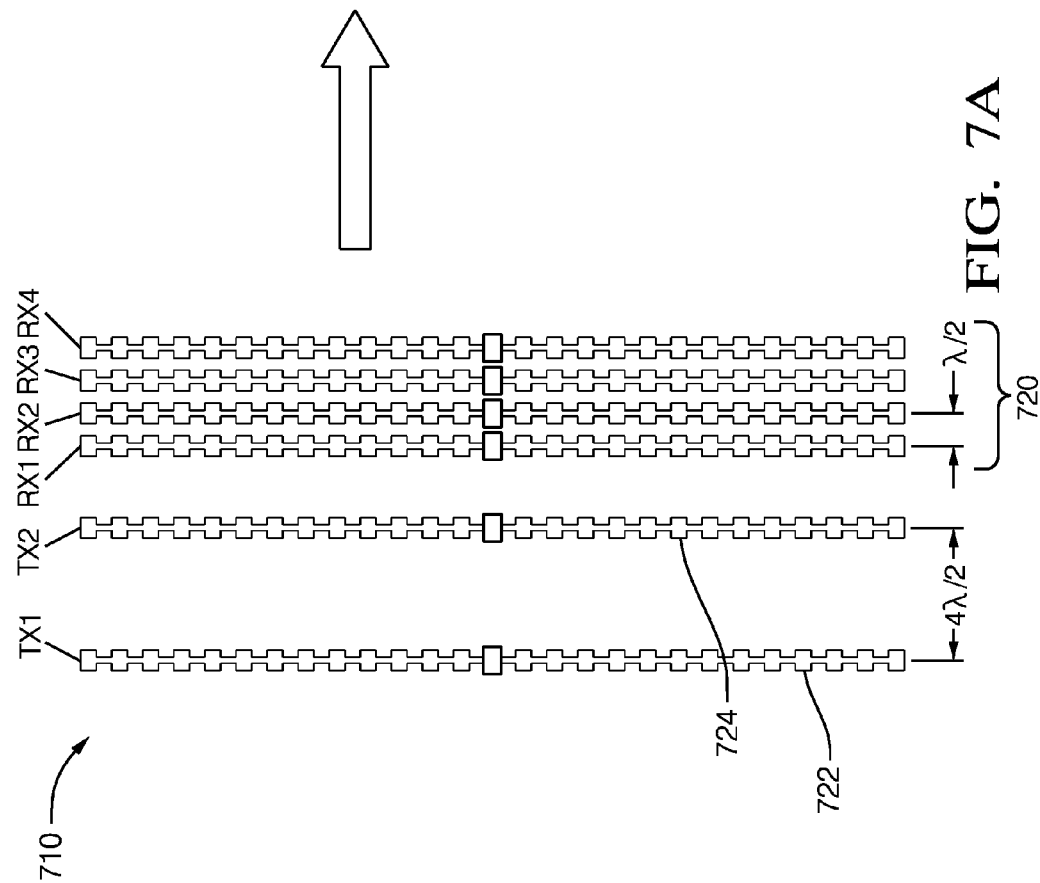

MIMO ANTENNA WITH ELEVATION DETECTION

TECHNICAL FIELD OF INVENTION

This disclosure generally relates to input multiple output (MIMO) antenna for a radar system, and more particularly relates to vertically offsetting one transmit antenna from another so an elevation angle to a target can be determined.

BACKGROUND OF INVENTION

Many ground vehicle (e.g. automotive) radar systems in use today are only able to determine distance and a horizontal or azimuth angle to a target or object. The transmit antenna and receive antenna for such a system are typically vertical arrays of radiator and detector elements or patches, respectively. However, it has been recognized that it is desirable to determine a vertical or elevation angle to the object so elevated objects such as a bridge or building overhang is not inadvertently designated as object that is in the travel path of the vehicle.

As automotive radar systems are especially sensitive to cost factors, the number of transmit antenna and receive antenna inputs is generally held to a minimum. The number of transmit and receive antennas influences the radar spatial capability in azimuth and elevation and also drives system cost. That is, more antennas provide better capability at the expense of increased cost. Prior attempts to add elevation resolution increased number of transmit and/or receive antennas with the attendant increase in system cost. In order to increase antenna gain, receive antenna may have multiple strings or arrays of detector elements. Parallel arrays increase spacing between the phase-centers of the sub-arrays which leads to grating lobes that cause an undesirably large variation in receive antenna sensitivity for various azimuth angles. One way to reduce the effects of grating lobes is to provide an analog beam-former designed to overlap the sub-arrays to effectively reduce the spacing between the phase-centers of the sub-arrays. However, this approach typically requires a complex multi-layer feed structure leading to undesirable higher cost.

SUMMARY OF THE INVENTION

In accordance with one embodiment, a multiple input multiple output (MIMO) antenna for a radar system is provided. The antenna includes a receive antenna, a first transmit antenna, and a second transmit antenna. The receive antenna is configured to detect radar signals reflected by a target toward the receive antenna. The first transmit antenna is formed of a first vertical array of radiator elements. The second transmit antenna is formed of a second vertical array of radiator elements distinct from the first vertical array. The second transmit antenna is vertically offset from the first transmit antenna by a vertical offset distance selected so an elevation angle to the target can be determined.

In another embodiment, a multiple input multiple output (MIMO) antenna for a radar system is provided. The antenna includes a first transmit antenna, a second transmit antenna, and a receive antenna. The first transmit antenna is configured to emit a first radar signal toward a target. The first transmit antenna is formed of a first vertical array of radiator elements. The second transmit antenna is configured to emit a second radar signal toward the target. The second transmit antenna is formed of a second vertical array of radiator elements distinct from the first vertical array. The receive antenna is configured to detect radar signals reflected by a target toward the receive antenna. The receive antenna is formed of a plurality of paired vertical arrays of detector elements.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIG. 1A is a multiple input multiple output (MIMO) antenna for a radar system in accordance with one embodiment;

FIG. 1B is an effective equivalent virtual receive antenna arising from the configuration of MIMO antenna of FIG. 1A;

FIG. 2A is a MIMO antenna for a radar system in accordance with one embodiment;

FIG. 2B is an effective equivalent virtual receive antenna arising from the configuration of MIMO antenna of FIG. 2A;

FIG. 4A is a MIMO antenna for a radar system in accordance with one embodiment;

FIG. 4B is an effective equivalent virtual receive antenna arising from the configuration of MIMO antenna of FIG. 4A;

FIG. 5A is a MIMO antenna for a radar system in accordance with one embodiment;

FIG. 5B is an effective equivalent virtual receive antenna arising from the configuration of MIMO antenna of FIG. 5A;

FIG. 6A is a MIMO antenna for a radar system in accordance with one embodiment;

FIG. 6B is an effective equivalent virtual receive antenna arising from the configuration of MIMO antenna of FIG. 6A;

FIG. 7A is a MIMO antenna for a radar system in accordance with one embodiment; and FIG. 7B is an effective equivalent virtual receive antenna arising from the configuration of MIMO antenna of FIG. 7A.

DETAILED DESCRIPTION

Figure 3A:
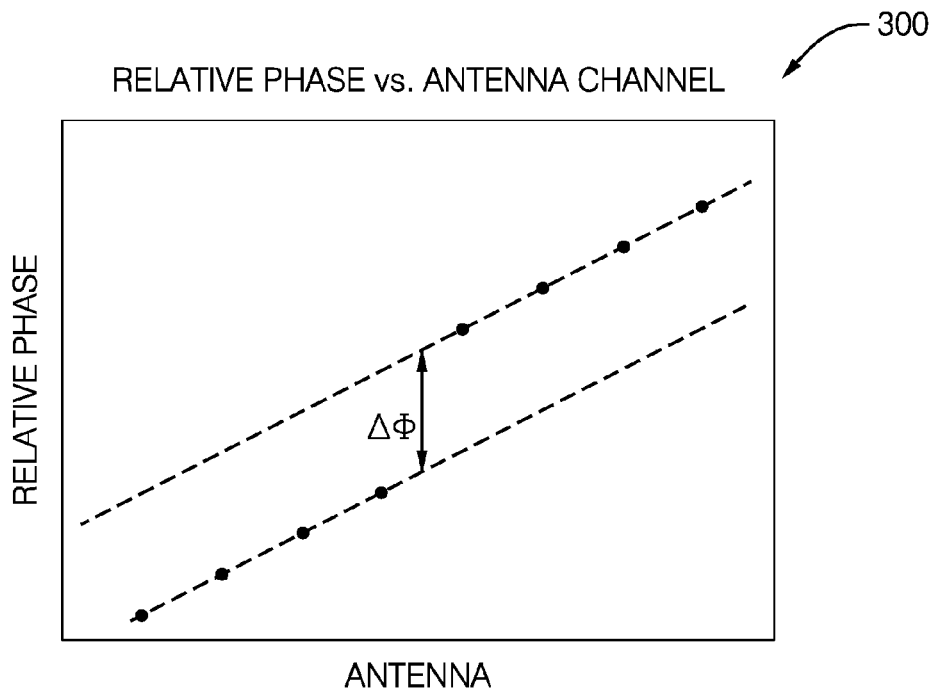
FIG. 3A is a graph of a performance characteristic of the MIMO antenna of FIG. 1A in accordance with one embodiment.

In general, multiple input, multiple output (MIMO) antenna architectures provide for electronic scanning with improved spatial coverage and resolution. MIMO operation typically requires multiple transmit and multiple receive antennas along with multiple transmitters and receivers. However, the teachings presented herein may also be applicable to simpler receive antenna configuration, for example, a single receive antenna consisting of a single element. Described herein are various configurations of MIMO antenna where the number of transmit and receive antennas depends on the spatial coverage and resolution required in both the azimuth (horizontal) and elevation (vertical) dimensions. The number of transmitters and receivers can equal the number of transmit and receive antennas, or a fewer number can be timeshared between the respective transmit and/or receiver antennas. However, for best performance, parallel transmit and receive channels are used, one channel per antenna, rather than timesharing.

The number of transmit and receive antennas influences the radar spatial capability in azimuth and elevation, and also influences system cost. In general, more antennas provide better capability at the expense of increased cost. As will be explained in more detail, an antenna or system that provides suitable azimuth resolution can be reconfigured in a straightforward manner to add elevation resolution. That is, some configurations of the MIMO antenna described herein provides both azimuth and elevation resolution without increasing the number of transmit or receive antennas when compared to a configuration that provides only azimuth (or elevation resolution) and also provides a suitable grating lobe characteristic. In other words, starting with a configuration that provides sufficient azimuth resolution, the improvement described herein adds elevation resolution without increasing the number of transmit (TX) antennas or receive (RX) antennas.

Another aspect of some of the MIMO configurations described herein includes spacing of multiple TX and RX antennas in the horizontal dimension which simultaneously provides for higher gain antennas with half wavelength spacing of the virtual synthetic array to avoid grating lobes. Larger, higher gain antennas offer better detection range and higher spatial resolution than small, lower gain antennas. To avoid grating lobes, the vertical arrays that form the TX and RX antennas are typically required to be spaced by half wavelength. Hence, larger antennas with either MIMO or conventional digital beam-forming architectures require additional TX and or RX channels (higher cost) for half wavelength spacing to avoid grating lobes.

Another aspect of the MIMO antenna configurations described herein includes a MIMO antenna configuration to double the size of both the TX and RX antennas with resulting 50% overlap of the sub-arrays of the virtual array without a separate analog feed structure. The increased size of the TX and RX antennas improves detection range and spatial resolution. In the particular configuration used, 50% overlap of the sub-arrays yields half wavelength spacing of the vertical arrays to form a virtual receive antenna that altogether eliminates grating lobes.

FIGS. 7A and 7B illustrates a non-limiting example of a MIMO antenna 710, and a virtual receive antenna 712 that illustrates the equivalent performance of the receive antenna 720 in cooperating with the first transmit antenna 722 and the second transmit antenna 724. That is, the six vertical arrays that form the receive antenna 720, the first transmit antenna 722 and the second transmit antenna 724 can provide the same gain and azimuth detection characteristics as the virtual receive antenna 712 when a single transmit antenna (not shown) is used. It should be appreciated that the MIMO antenna 710 needs two transmitters and four receivers to operate (assuming that the transmitters and receiver are not being multiplexed or otherwise time shared) to provide the same performance as one transmitter and eight receivers connected to the virtual receive antenna 712.

Because the four receive arrays (RX1, RX2, RX3, RX4) are each single element arrays (i.e. have a single string of detector elements), the four receive arrays can be physically spaced apart by one-half wavelength ($\lambda/2$). By horizontally spacing the first transmit antenna 722 two wavelengths ($4\lambda/2$) apart from the second transmit antenna 724, the virtual receive antenna has eight single element arrays with one half wavelength spacing as shown. Hence, the resulting virtual receive antenna 712 is effectively twice the width of the receive antenna 720 to thereby improve the effective spatial resolution of the receive antenna 720 by a factor of two.

It is noted that the MIMO antenna 710 can be used to determine a horizontal or azimuth angle of multiple targets via digital beam-forming, but the MIMO antenna 710 is generally not useful to measure a vertical or elevation angle of a target. One approach to add elevation measurement capability would be to split the TX or RX antennas in the vertical dimension to double the number of TX or RX antennas and their respective transmit or receive channels (i.e.—a 4-TX/4-RX configuration or a 2-TX/8-RX configuration).

Continuing to refer to FIG. 7 as an example, radar detection range may be limited by the gain of the individual antennas. Increasing the height of the antennas could be an option to increase antenna gain, but height is often limited by package size constraints and/or the elevation coverage needed. The TX antennas can be increased in width by adding additional parallel vertical arrays to improve detection range, but width may be limited by the azimuth coverage needed. Similar increasing of the width of the RX antennas increases gain, but would also increase their spacing to greater than half wavelength which leads to undesired grating lobes in digital beam-forming. Another option is to increase the number of TX and/or RX antennas with subsequent increase in cost.

By way of example and not limitation, sizes or dimensions of features of the various MIMO antenna described herein are selected for a radar frequency of $76.5*10^9$ Hertz (76.5 GHz). Those skilled in the art will recognize that the features can be scaled or otherwise altered to adapt the antenna 110 for operation at a different radar frequency. The vertical arrays may also be known as microstrip antennas or microstrip radiators, and may be arranged on a substrate (not shown). Each vertical array may be a string or linear array of elements or patches formed of half-ounce copper foil on a 380 micrometer (μm) thick substrate such as RO5880 substrate from Rogers Corporation of Rogers, Conn. A suitable overall length of the vertical arrays is forty-eight millimeters (48 mm). The elements or patches may have a width of 1394 μm and a height of 1284 μm. The patch pitch may be one guided wavelength of the radar signal, e.g. 2560 μm, and the microstrips interconnecting each of the patches may be 503 μm wide. Preferably, the elements or patches are arranged on the surface of the substrate, and other features such as a feed network are arranged on an inner layer or backside of the substrate. It should be recognized that the various MIMO antenna illustrated herein are generally configured to transmit and detect radar signals in a direction normal to the view of the MIMO antenna presented. That is, the bore-site of each MIMO antenna is generally normal to the view presented, i.e. is normal to the page.

FIGS. 1A and 1B illustrate a non-limiting example of a multiple input multiple output (MIMO) antenna 110 for a radar system (not shown) that establishes the virtual receive antenna 112 illustrated. The MIMO antenna 110 includes a receive antenna 120 configured to detect radar signals (not shown) reflected by a target (not shown) toward the receive antenna 120. The MIMO antenna 110 also includes a first transmit antenna 122 formed of a first vertical array 132 of radiator elements 136; and a second transmit antenna 124 formed of a second vertical array 134 of radiator elements 138 distinct (i.e. separate) from the first vertical array 132. In contrast to the example shown in FIG. 7, the second transmit antenna 124 is vertically offset from the first transmit antenna 122 by a vertical offset distance 126. The vertical offset distance 126 is selected so an elevation angle to the target can be determined. By way of example and not limitation, a suitable vertical offset distance 126 is one-half wavelength, for example 1.96 mm at 76.5 GHz. More importantly, a first transmit phase-center 142 of the first transmit antenna 122 is vertically offset from a second transmit phase-center 144 of the second transmit antenna 124. As used herein, the phase-center of an antenna or array is generally located at the center of the radiated energy distribution pattern if the antenna is being used to transmit a radar signal. That the first transmit antenna 122 and the second transmit antenna 124 are shown to be the same configuration is only to facilitate the explanation presented herein. In this non-limiting example, the transmit antennas are fed a signal at the mid-point of the respective transmit antennas, and so the phase-centers of the transmit antennas are also at the mid-points. However, as will be recognized by those in the art, this is not a requirement. That is, the feeds for the antenna could be at other than a mid-point, and/or the pitch of the radiator elements could be varied so the phase-center of the antenna is at a location other than the mid-point.

As with the MIMO antenna 710 (FIG. 7), the second transmit antenna 124 is horizontally offset from the first transmit antenna 122 by a horizontal offset distance 128 selected so the virtual receive antenna 112 is established as shown, thereby doubling the effective width of the receive antenna 120, but keeping the spacing of the vertical arrays forming the virtual receive antenna 112 at one half wavelength ($\lambda/2$).

The vertical offset distance 126 is selected so that the second transmit antenna 124 intersects a horizontal line 130 that intersects the first transmit antenna 122. By way of a different explanation, if the second transmit antenna 124 was moved to the left to be in line with the first transmit antenna 122, the second transmit antenna 124 would vertically overlap the first transmit antenna. If the vertical offset distance 126 is too small, the elevation measurement may exhibit poor accuracy. If the vertical offset distance 126 is too large, the elevation measurement may have ambiguities. The vertical overlap itself is not required; it's just a result of the vertical size of the TX antennas compared to the vertical offset. For example, the TX antennas shown are about 12 wavelengths tall while a representative vertical offset would be one half to one wavelength. In other situations the TX antennas could each be a single patch and then the vertical offset would not result in any vertical overlap.

Similar to the various MIMO antenna described herein, the receive antenna 112 (and other receive antenna described herein) includes one or more vertical arrays 150 of detector elements 152. The first transmit antenna 122, the second transmit antenna 124, and the receive antenna cooperate to establish, as suggested by the arrow 154, the virtual receive antenna 122. The virtual receive antenna is a representation of a receive antenna that has the same performance as, i.e. is equivalent to, the MIMO antenna from which it is established. That is, the virtual receive antenna 112 receiving a reflected radar signal from a single transmit antenna (not show) has the same or equivalent performance characteristics as the MIMO antenna 110.

The virtual receive antenna can be further characterized by noting that the first transmit antenna 122 and the receive antenna 120 cooperate to establish a first group of phase-centers 156. Similarly, the second transmit antenna 124 and the receive antenna 120 cooperate to establish a second group of phase-centers 158. It should be understood that these groups of phase centers are virtual phase centers of the virtual receive antenna 112. As a result of the vertical offset of the second transmit antenna 124 relative to the first transmit antenna 122, the second group of phase-centers 158 is vertically offset from the first group of phase-centers 156. As such, elevation measurement capability is added by offsetting or displacing the second transmit antenna 124 relative to the first transmit antenna 122 in the vertical direction as shown. The phase offset between the virtual phase centers is related to the elevation angle of the target relative to the bore site of the MIMO antenna by the relationship $\Delta\Phi = 2\pi(d/\lambda) \sin \emptyset$, where the target elevation angle $\emptyset$ can be determined by the phase offset $\Delta\Phi$.

Because the receive antenna 120 is formed of single strings of detector elements 152, the spacing of the vertical arrays 150 can be one-half wavelength. As such, acceptable azimuth performance with minimal lobe grating effects can be achieved if the second transmit antenna 124 is horizontally offset from the first transmit antenna 122 by a horizontal offset distance 128 selected so the gap between the second group of phase-centers 158 and the first group of phase-centers 156 is one-half wavelength. For the example shown, the appropriate spacing between the transmit antennas is two wavelengths. In other words, grating lobes can be avoided if the horizontal spacing between all of the individual phase centers of the virtual receive antenna is one-half wavelength. However, in FIG. 1B for example, if the two halves of the virtual array are processed together without compensating for the phase offset delta phi ($\Delta\Phi$) due to target elevation, then "partial" grating lobes may occur at a level determined by the vertical offset distance 126. It is noted that the MIMO antenna 110 (and other MIMO antenna described herein) has two transmitter inputs and four receiver inputs for a total of six inputs that must be serviced by the radar system to provide equivalent performance of an antenna with one transmitter input and eight receiver inputs for a total of nine inputs that would need to be serviced to provide equivalent performance of the MIMO antenna shown.

FIGS. 2A and 2B illustrate another non-limiting example of a MIMO antenna 210 antenna that establishes the virtual receive antenna 212 illustrated. In this non-limiting example the first transmit antenna 222 is formed of a first paired vertical array 232 of radiator elements 236, and the second transmit antenna 224 is formed of a second paired vertical array 234 of radiator elements 238. Similarly, the receive antenna 220 is formed of one or more paired vertical arrays 250 formed of detector elements 252. Paired vertical arrays are advantageous with respect to the single element arrays shown in FIG. 1A because the paired vertical arrays have greater antenna gain. However, because of the additional width, the phase centers 246 of the receive antenna 220 are spaced apart by one wavelength ($\lambda$) instead of the preferred one-half wavelength ($\lambda/2$) as is the case for the MIMO antenna 110 shown in FIG. 1. Typically, one wavelength spacing would lead to undesirable grating lobe characteristics.

In order to improve the grating lobe characteristics, the horizontal offset distance 228 is selected so the second group of phase-centers 258 intersects a vertical line 260 that intersects the first group of phase-centers 256. By way of an alternative description, if the vertical offset distance 226 ($d$) were zero, the second group of phase-centers 258 would horizontally overlap the first group of phase-centers 256. The horizontal offset distance 228 can be further selected so the first group of phase-centers 256 is interleaved with the second group of phase-centers 258. In particular, the interleaving can be such that at least some of the first group of phase-centers 256 cooperates with the second group of phase-centers 258 so that the virtual receive antenna 212 has some (preferably most) of the phase centers horizontally spaced apart by one-half wavelength (λ/2) in order to improve the grating lobe characteristics of the MIMO antenna 210. For the example shown, the appropriate spacing between the transmit antennas is 3.5 wavelengths. In this case most of the phase centers are spaced by one-half wavelength in the horizontal direction while the spacing of the last phase center on either side of the virtual array is spaced by one wavelength. This would result in "partial" grating lobes but even this effect can be mitigated by interpolation techniques.

Once target elevation is determined, the phase offset delta phi (ΔΦ)) induced by target elevation (illustrated for example in FIGS. 3A and 3B) can be corrected prior to digital beam-forming in azimuth in order to eliminate or minimize grating lobes for configurations similar to those of FIG. 1 and FIG. 4 where the horizontal spacing is one-half wavelength for all phase centers. Referring to FIG. 2, the phase-centers (256, 258) of the resulting virtual receive antenna 212 are arranged to form a triangular wave pattern. The vertical offset of the phase-centers provides capability to measure target elevation angle using a phase comparison approach. The horizontal spacing of vertically aligned phase-centers is equal to one wavelength which would typically lead to grating lobes in subsequent azimuth beam-forming. This triangular spacing provides some degree of grating lobes suppression since, when projecting to the horizontal dimension, the phase-center spacing is equal to one-half wavelength. In essence, with triangular spacing, the grating lobes are displaced off the principal plane and reduced in amplitude by amounts depending on the vertical offset distance 226 of the TX antennas (222, 224). This aspect of grating lobe suppression (by displacing off the principle plane and reducing in amplitude) is provided without any correction for the target elevation induced phase offset. If the phase offset delta phi (ΔΦ) is corrected, the grating lobes are suppressed. However, there are issues that will, in practice, limit the suppression. First, the correction is generally only valid for a single target in a range-Doppler bin. However, the technique described to estimate elevation from phase offset delta phi only generally works for a single target in a range-Doppler bin as well.

FIG. 3A is a graph 300 of the relative phase of each of the phase centers that form the virtual receive antenna 112 where, given a single target in a range-Doppler bin, the relative phase of each vertical array of the virtual receive antenna 112 is illustrated. The slope of the linear phase progression is related to target azimuth. The phase offset between the virtual phase centers is related to the elevation angle of the target relative to the bore site of the MIMO antenna by the relationship $\Delta\Phi = 2\pi(d/\lambda)\sin\emptyset$, where the target elevation angle $\emptyset$ can be determined by the phase offset $\Delta\Phi$. As discussed above, once target elevation is determined, the phase offset $\Delta\Phi$ can be corrected prior to digital beam-forming in azimuth in order to eliminate grating lobes altogether.

Figure 3B:
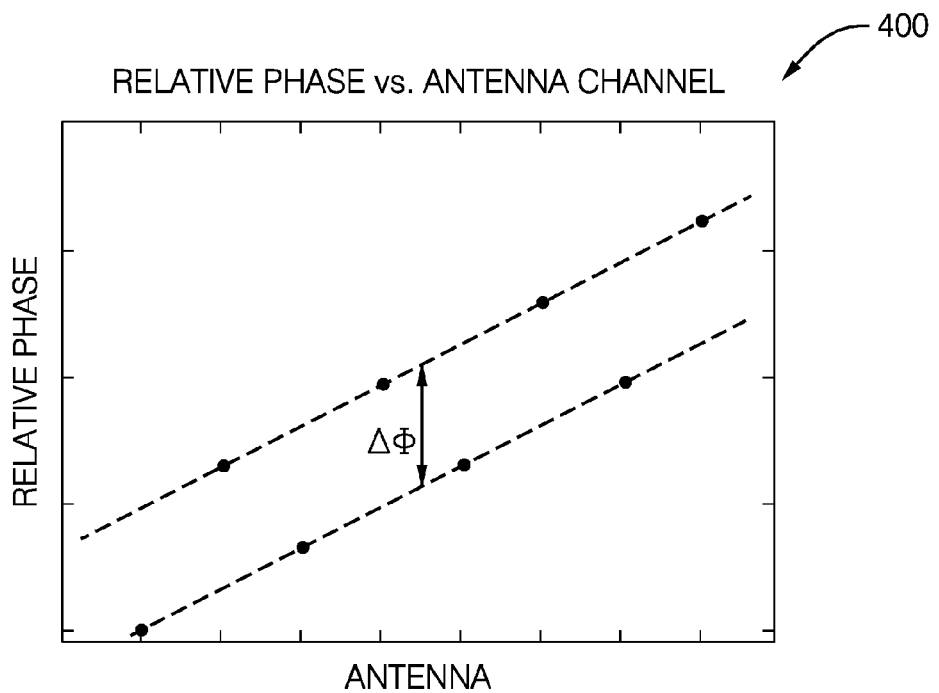
FIG. 3B is a graph of a performance characteristic of the MIMO antenna of FIG. 4A in accordance with one embodiment.

FIG. 3B is a graph 400 of the relative phase of each of the phase centers that form the virtual receive antenna 412 (FIG. 4B) where, given a single target in a range-Doppler bin, the relative phase of each vertical array of the virtual receive antenna 412 is illustrated. As describe before, the slope of the linear phase progression is related to target azimuth. The phase offset between the virtual phase centers is related to the elevation angle of the target relative to the bore site of the MIMO antenna by the relationship $\Delta\Phi = 2\pi(d/\lambda)\sin\emptyset$, where the target elevation angle $\emptyset$ can be determined by the phase offset $\Delta\Phi$. Once target elevation is determined, the phase offset can be corrected prior to digital beam-forming in azimuth in order to eliminate grating lobes altogether. The signal received from each antenna may be characterized by a complex number indicative of amplitude and phase. To estimate target elevation, the phase offset delta phi (ΔΦ) is computed, see FIG. 3B. Computing the phase offset from the complex valued signals should be clear to those skilled in the art. Once this phase offset is known, a target elevation is calculated by solving the equation above. Then, this phase offset is subtracted from the complex valued signals from half the elements of the virtual array, for example, from every other antenna for FIG. 4B so that the corresponding phases in the FIG. 3B are shifted so the phases of all the phase centers lie along the same line. Then, digital beam-forming will form a peak at the target azimuth angle without any grating lobes.

Another technique to estimate target elevation angle is to perform digital beam-forming in azimuth with phase offset corrections for different target elevation angles. The phase offset that minimizes the grating lobe level determines the elevation angle of the target. Unlike the first technique, the second technique can work for multiple targets in the same range-Doppler bin at different azimuth and elevation angles.

FIGS. 4A and 4B illustrate another non-limiting example of a MIMO antenna 410 antenna that establishes the virtual receive antenna 412 illustrated. In this non-limiting example the first transmit antenna 422 is formed of a single vertical array, and the second transmit antenna 424 is formed of a single vertical array. As such, the transmit antennas are comparable to those shown in FIG. 1A. Similar to FIG. 2A, the receive antenna 420 is formed of one or more paired vertical arrays. Paired vertical arrays are advantageous with respect to the single element arrays shown in FIG. 1A because the paired vertical arrays have greater antenna gain. However, because of the additional width, the phase centers 446 of the receive antenna 420 are spaced apart by one wavelength (λ) instead of the preferred one-half wavelength (λ/2) as is the case for the MIMO antenna 110 shown in FIG. 1. The first group of phase-centers 456 and the second group of phase centers 458 of the virtual receive antenna 412 are arranged as indicated.

Typically, one wavelength spacing would lead to undesirable grating lobe characteristics. However, since the transmit antennas have a horizontal offset distance 428 of one-half wavelength (λ/2), the phase center pattern of the virtual-receive antenna 412 is fully interleaved with all of the virtual receive antenna arrays having a horizontally spacing of one-half wavelength (λ/2). The vertical offset distance 426 of the transmit antennas involves tradeoffs in elevation measurement accuracy and ambiguities as previously discussed. To avoid ambiguity in estimating target elevation angle, the vertical offset distance can be selected to be one-half wavelength (λ/2).

The MIMO antennas described thus far have been configured to provide elevation angle detection by vertically offsetting the transmit antennas. However, if there is no desire for elevation angle detection, the features that provide for improved grating lobe characteristics can still be utilized when the vertical offset distance is set to zero.

FIGS. 5A and 5B illustrate another non-limiting example of a MIMO antenna 510 antenna that establishes the virtual receive antenna 512 illustrated. The MIMO antenna 510 includes a first transmit antenna 522 configured to emit a first radar signal (not shown) toward a target (not shown). The first transmit antenna in this example is formed of a first vertical array of radiator elements that is a single string or single vertical array of radiator elements. the MIMO antenna also includes a second transmit antenna 524 configured to emit a second radar signal (not shown) toward the target. Similarly, the second transmit antenna is formed of a second vertical array of radiator elements that is a single string and is distinct from the first vertical array.

The MIMO antenna 510 also includes a receive antenna 520 configured to detect radar signals reflected by a target toward the receive antenna 520. In this example the receive antenna 520 is formed of a plurality of paired vertical arrays of detector elements similar to the receive antenna 220 of FIG. 2A. Paired vertical arrays are advantageous with respect to the single element arrays shown in FIG. 1A because the paired vertical arrays have greater antenna gain. However, because of the additional width, the phase centers 446 of the receive antenna 520 are spaced apart by one wavelength (λ) instead of the preferred one-half wavelength (λ/2) as is the case for the MIMO antenna 110 shown in FIG. 1. The first group of phase-centers 556 and the second group of phase centers 558 of the virtual receive antenna 512 are arranged as indicated.

Typically, one wavelength spacing would lead to undesirable grating lobe characteristics. However, since the transmit antennas have a horizontal offset distance 528 of one-half wavelength (λ/2), the phase center pattern of the virtual-receive antenna 512 is fully interleaved with all of the virtual receive antenna arrays having a horizontally spacing of one-half wavelength (λ/2).

FIGS. 6A and 6B illustrate another non-limiting example of a MIMO antenna 610 that establishes the virtual receive antenna 612 illustrated. In this non-limiting example the first transmit antenna 622 is formed of a first paired vertical array of radiator elements, and the second transmit antenna 624 is formed of a second paired vertical array of radiator elements. Having the transmit antenna be formed of paired vertical arrays is advantageous as the radar signals emitted by the transmit signal are more focused along the bore site of the antenna. However, because of the additional width, horizontal offset distance 628 is increased relative to the prior example, so the transmit antennas are spaced apart by more than one-half wavelength (λ/2). As such, some of the interleaving of the virtual receive antenna 612 is lost when compared to FIG. 5B.

Similar to prior examples, the first transmit antenna 622 and the receive antenna 620 cooperate to establish a first group of phase-centers 658. Similarly, the second transmit antenna 624 and the receive antenna 620 cooperate to establish a second group of phase-centers 658 distinct from the first group of phase-centers 656. Because the second transmit antenna 624 is horizontally offset from the first transmit antenna 622, the first group of phase-centers 656 are horizontally offset from the second group of phase-centers 658. Since the paired vertical arrays that form the receive antenna 620 are spaced apart more than one-half wavelength (λ/2), the horizontal offset distance 628 may be advantageously selected so the first group of phase-centers 656 intersects a vertical line 660 that intersects the second group of phase-centers 658. In other words, the horizontal offset distance 628 may be advantageously selected so the first group of phase-centers 656 horizontally overlaps the second group of phase-centers 658.

The horizontal offset distance 628 may also be advantageously selected so the first group of phase-centers 656 is interleaved with the second group of phase-centers 658 as opposed to having a phase center of one group coincide with a phase center from the other group. In general, the radar signals emitted by the transmit antenna may be characterized by a wavelength. Preferably, each of the plurality of paired vertical arrays that form the receive antenna 620 is horizontally spaced apart by one wavelength, and the horizontal offset distance 628 is selected so at least some of the phase-centers of the virtual receive antenna 612 are horizontally spaced apart by one-half wavelength.

Accordingly, a variety of MIMO antennas are provided. Some configurations provide for detecting an elevation angle to a target by vertically offsetting a pair of transmit antennas relative to each other. Some configurations provide for improved grating lobe characteristics when relatively wide antenna (i.e. paired vertical arrays) are used to improve gain by arranging the transmit antenna so a virtual receive antenna is established that provides for preferred grating lobe characteristic normally found with narrow antenna (i.e. single string arrays) that can be physically spaced apart by one-half wavelength. These features can be combined so that a MIMO antenna is provided that enjoys the increased gain provided by paired vertical arrays, but also has grating lobe characteristics comparable to those receive antennas that have single string arrays spaced apart by one-half wavelength. As noted above, this is an advantage over prior attempts to overlap sub-arrays to get half wavelength spacing using a complex, multi-layer feed network.

While this invention has been described in terms of the preferred embodiments thereof, it is not intended to be so limited, but rather only to the extent set forth in the claims that follow.

I claim:

1. A multiple input multiple output (MIMO) antenna, said antenna comprising:
   a receive antenna configured to detect radar signals reflected by a target toward the receive antenna, wherein the receive antenna comprises a plurality of vertical arrays of detector elements;
   a first transmit antenna used to emit radar signals toward the target, said first transmit antenna formed of a first vertical array of radiator elements; and
   a second transmit antenna used to emit radar signals toward the target, said second transmit antenna formed of a second vertical array of radiator elements distinct from the first vertical array, wherein the second transmit antenna is vertically offset from the first transmit antenna by a vertical offset distance selected so an elevation angle to the target can be determined based on the radar signals received by the receive antenna that were transmitted from the first transmit antenna and the second transmit antenna,
   wherein the first transmit antenna and the receive antenna cooperate to establish a first group of phase-centers of a virtual receive antenna, and the second transmit antenna and the receive antenna cooperate to establish a second group of phase-centers of the virtual receive antenna vertically offset from the first group of phase-centers, wherein the second transmit antenna is horizontally offset from the first transmit antenna, whereby the first group of phase-centers are horizontally offset from the second group of phase-centers, wherein a horizontal offset distance between the first transmit antenna and the second transmit antenna is selected so the first group of phase-centers is interleaved with the second group of phase-centers.

2. The MIMO antenna in accordance with claim 1, wherein the vertical offset distance is such that the second transmit antenna intersects a horizontal line that intersects the first transmit antenna.

* * * * *